Sept. 22, 1964  C. C. CLEVELAND  3,150,010
ELECTROLYTE CONTROL FOR A BATTERY
Filed Oct. 18, 1961

INVENTOR.
CLARK C. CLEVELAND
BY W. E. Quesenberry
O. E. Hodges
ATTYS.

United States Patent Office 3,150,010
Patented Sept. 22, 1964

3,150,010
ELECTROLYTE CONTROL FOR A BATTERY
Clark C. Cleveland, Bennington, Vt., assignor, by mesne assignments, to the United States of America as represented by the Secretary of the Navy
Filed Oct. 18, 1961, Ser. No. 146,051
3 Claims. (Cl. 136—90)

This invention relates generally to an improved electrochemical battery and more particularly to a new and improved arrangement and construction of the A cell location in a spin-filled reserve energizer utilized as a power source for a proximity fuze located within a projectile.

In the deferred action type battery art the technology has provided, by the use of new metals and new techniques, a battery design that is able to produce a high voltage while occupying a very small space. For example, a deferred action battery capable of producing a 180-volt output will have a height from between 1 and 2 inches and be approximately 1½ inches in diameter.

In the prior art electro-chemical batteries for a proximity fuze utilized an elongated series of annular plates. The most common construction is a battery having a single fill channel with a plurality of entry ports that permit passage of the electrolyte from a central cavity into the individual cell compartment.

In these prior art energizers, it is the general practice to construct an energizer by positioning the C and B sections adjacent to the A section. The energizer is made up in part of a multiple of cells comprising series connected B and C sections. Adjacent to the multiple series connected cells is a multiple of cells parallel connected and comprising an A section. With this particular construction the electrolyte was distributed to the battery cells partially by splashing during the breaking of the ampule and partially by the electrolyte being forced into the fill channel by the spinning of the projectile.

As the fuze circuitry became more involved it became desirable to reduce the size of the components but the annular plate stack system did not lend itself to miniaturization, particularly in the case of high voltage batteries. In order to accomplish miniaturization in the high voltage batteries it was necessary to split the high voltage sections into half plates thereby providing the so-called "split stack structure" of the type utilized by this invention. The reserve energizers that are utilized in the various projectiles generally rely on the ballistic features of the projectile to release and distribute electrolyte which is held initially in an ampule, or other frangible container, out of contact with the active electrode elements. It has generally been found that the electrolyte released from the ampule by the set-back forces is generally distributed by the rotation of the projectile causing the electrolyte to begin filling the cells from the bottom of the battery upward one cell at a time, except for a fortuitous splash distribution that occurs from the turbulence introduced at the instant of the electrolyte release.

The splash filling normally is not sufficiently reliable nor complete enough to allow the cell to carry the required electrical loading imposed on the different battery sections. Miniaturization of the battery, such as shortening the stack, has exaggerated the problem of turbulence and increased the degree of splash filling. In a multiple section battery, the A section has cells that are generally parallel connected and are used for the heavy filament loading of the electron tubes. These A section cells are usually more widely spaced than the series connected B and C sections, which have a lighter electrical load. As a result of the A section cells having a wider space between the cells the electrolyte will more readily enter the A section by splash filling than either of the B or C sections.

Because a proximity fuze may be fired from guns of various sizes, it is of particular importance that the reserve energizer be able to operate over a broad temperature spectrum and under various ballistic operating conditions imposed by a variety of weapons which have different spin and set-back characteristics, as well as different flight eccentricities. It is essential that the electrolyte of the reserve energizer enter each of the sections with a fairly uniform distribution.

The general purpose of this invention is to provide a reserve energizer of the split stack type with a particular construction insuring that the electrolyte will be properly distributed to each of the sections. This particular invention embraces all the advantages of the split stacked energizer but possesses none of the aforedescribed disadvantages. To attain this, the present invention contemplates a unique hood type construction over one of the sections to effect a uniform filling of the battery with electrolyte by the centrifugal forces acting thereon.

It is therefore an object of this invention to provide a new and improved split stack energizer of the type having a uniform electrolyte distribution.

It is another object to provide a split stack reserve energizer that will have uniform electrolyte distribution regardless of initial set-back forces.

A further object is to provide a reserve energizer of the split stack type having a means for limiting the entry of electrolyte into the energizer during the turbulent period thereof resulting from the set-back forces.

Still another object is to provide new and improved means for limiting the amount of electrolyte that may enter one section of the energizer during the turbulent period, but allowing it to enter other sections during this same period.

A still further object is to provide a reserve energizer of a spin type with a hood at one end to limit the amount of electrolyte entering into the A section of the energizer resulting from the splashing of the electrolyte due to the breaking of the ampule.

Further objects and the entire scope of the invention will become further apparent in the following detailed description and in the appended claims. The accompanying drawings display the general construction and operational principles of the invention; it is to be understood, however, that the drawings are furnished only by way of illustration and not in limitation thereof and wherein:

Figure 1:
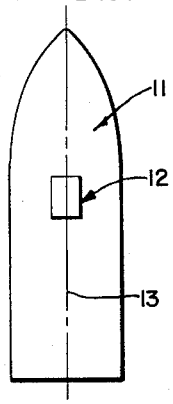
FIG. 1 is a sectional view of a projectile utilizing a split stack reserve energizer of the type disclosed herein.

Referring now to the drawing wherein like reference characters designate like or corresponding parts throughout the several views, there is shown in FIG. 1 a projectile 11 with a reserve energizer of the split stack variety concentrically located about the longitudinal axis of the projectile. The projectile is of the type having high initial set-back forces and low spin characteristics. Also contained within the projectile, but not shown, is a proximity fuzing system or other electrical equipment requiring a power source of the type herein described.

Figure 2:
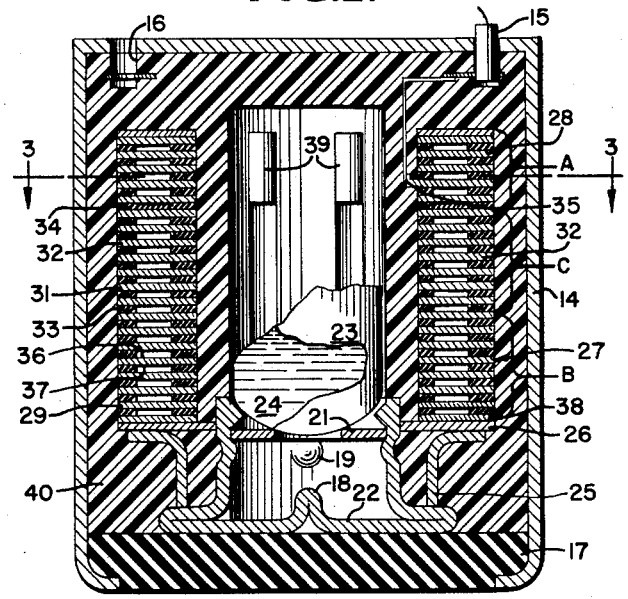
FIG. 2 illustrates a sectional view of the reserve energizer utilizing the present invention taken along 2—2 of FIG. 4.

FIG. 2 illustrates a sectional view of the reserve energizer comprising a battery casing 14 which encapsulates all the components of the reserve energizer. The electrical connections to the electrical equipment in the projectile are made by a plurality of electrical connections 15 preferably of the plug type extending through aperture 16 in the battery casing. The base member 17 of the reserve energizer is composed of any suitable non-metallic material. Supported by the base member 17 is a breaker platform 22 having a plurality of dimples 19 therein for maintaining the ampule support 21 in position. An irregular shaped breaker device 18 is located directly beneath the ampule support 21. On the ampule support 21 is a frangible glass ampule 23 which contains a suitable amount of electrolyte 24 for this size battery. The ampule support 21 is made of a spring-like material which will flex when subjected to sufficient setback forces upon firing of the projectile and slip past the dimples 19 allowing the ampule to strike the irregular-shaped breaker 18. The frictional contact between the ampule support 21 and the dimples 19 is sufficient to maintain the ampule in position during normal handling and shipping of the energizer but is insufficient to maintain the ampule in this position when the projectile is fired.

Figure 4:
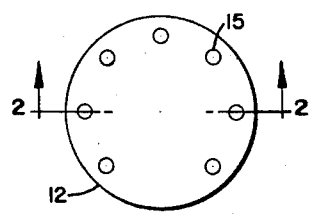
FIG. 4 is an enlarged plan view of the split stack reserve energizer of the present invention.
Figure 3:
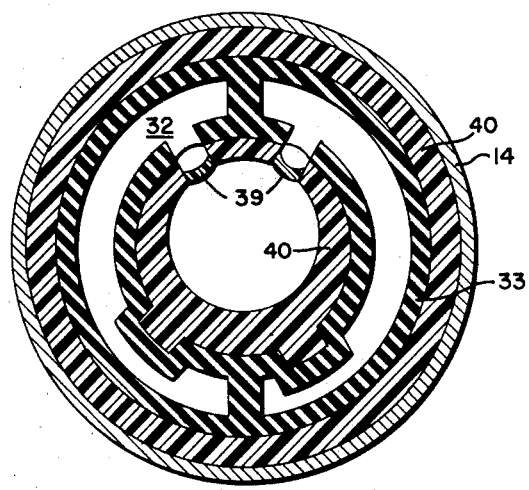
FIG. 3 is a view taken along line 3—3 of FIG. 2, illustrating the location of the structure for preventing the entering of the electrolyte into the A section by splashing.

Bearing against the breaker platform 22 is a stack support 25 which abuts the cell support disc 26. Located on the cell support disc 26 are a plurality of cells 27 which comprise a filament heater A section 28, high voltage B section 29 and grid bias C section 31 of the reserve energizer. The A section of the battery is made up of a plurality of annular plates 32 and a paper separator 33 with a cavity therein interposed between each pair of plates. Abutting the last annular plate 32 is a paper separator 33 and a stack height adjusting washer 34. Obviously the height adjusting washer may be fabricated of any desired thickness or may be omitted depending upon the desired stack height. It should be understood that the various sections of the annular stack of cells illustrated as the A, B and C sections merely represent the order of these sections within the annular stack and are not intended to define a specific number of cells within each of the sections. Any one of the A, B, or C sections may be connected to the output terminals shown in FIG. 4 by any convenient means and such connection would appear obvious to one skilled in the art. For further detailed illustration of how the various sections of the annular stack of cells may be connected to output terminals, reference may be made to applicant's copending application Serial No. 162,610, filed December 27, 1961, and Patent No. 2,981,779, both of which are assigned to the assignee of the present invention.

Annular plates 32 are made of steel with a thin coating of nickel plate. A second coating of suitable compound is located on the flat surfaces of the annular plates which when combined with a suitable electrolyte will provide the necessary electro-chemical reaction to provide energization of the battery. For example, the cells in the A section are parallel connected and each alternate plate will be covered with lead dioxide on the flat surfaces and the intermediate plates will have a coating of lead. The alternate and the intermediate plates are respectively connected together with appropriate terminal means 35, substantially as shown, to provide output connections for the battery. The A secton of the battery has two scallops in each of the annular plates. The insulator located between the plates has a pair of apertures of substantially the same size as the scallops. The fill channels are located on radii and at an angle therebetween of approximately 52°. Located between the stack support 25 and the A section of the battery is the B section 29 and C section 31 of the reserve energizer. The plates for the B section and C section are semicircular in shape and are stacked to form a substantially circular formation. In between each of the semicircular discs is located a semicircular paper insulator having a portion of the inside removed to form a cavity between each of the adjacent semicircular discs. The semicircular plates are made of any suitable material, for example, steel with a flashing of nickel and covered with a suitable compound over their flat surfaces which when combined with a suitable electrolyte would provide the necessary electrochemical reaction to provide energization of the battery. The semicircular plates are the cells in the B and C sections of the battery and are series connected. The semiannular plates may be coated on one surface with lead dioxide 36 and with the lead 37 on the other surface thereof. Suitable connecting means, not shown, are located on each of the B and C sections to allow the plates to be appropriately connected to the terminal output connections of the battery. The entire circular stack of cells is encapsulated by a suitable potting compound 40 substantially as shown. The potting compound is forced in between the semicircular plates thereby insulating each semicircular plate from the parallel plate on the same plane. The potting compound also covers the inside surface of the circular and semicircular shaped plates except in the area where the plates and paper insulators are scalloped. This provides a fill channel for the electrolyte to enter between each of the plates when the ampule is broken and the shell is subjected to rotation. Annular plate 26 abutting the cell stack support disc 25 may have the surface coated with nickel to assure a good electrical connection between the two stacks. The breaker platform 22, stack support 25 and cell support 26 are each constructed of steel or other suitable electrical conducting material and may be plated with silver, cadmium or the like, to insure good electrical contact therebetween. Connections between the plates and terminals of the battery may be made by any suitable connecting means as would be apparent to one skilled in the art; such connection having not been shown for the sake of simplicity.

One of the major problems that has hampered rapid development of the split stack structure type of energizer has been the mal-distribution of electrolyte which occurs in the battery during the initial breaking of the ampule during the set-back period. It was discovered that by reducing the overall height of the reserve energizer that the distribution of the electrolyte was substantially changed during the splashing period. It was found that the method of the ampule breakage permitted the A section to accept a substantial amount of electrolyte immediately after the ampule ruptured. The A section of the reserve energizer is used both as a power producing section and as a reservoir to accommodate the fluctuations in electrolyte levels which occur from temperature variations and eccentricities in flight, introduced by variations in the flight operation of projectiles from guns with different set-back and spin forces.

To accommodate the electrolyte variations, the A section was designed to operate satisfactory with electrolyte filling about half full the cells of this section.

In the split stack reserve energizers of type described herein it was found in many cases that the A section would accept electrolyte in excess of this half full condition, thereby robbing the B and C sections at some point within the two halves of the stack. It was also discovered that the bulk of the electrolyte splashed directly into the A section during breaking of the ampule rather than running up the two fill channels and discharging the excess into the A section after both halves of the B section and C section were filled. The novel hood or channel cover 39 is molded into place over the channel at the top of the A section as part of the stack lining operation, so that, it would prevent the A section from receiving any appreciable amount of electrolyte by splash distribution. This novel design forces the A section to fill with electrolyte from the liquid flowing up the two fill channels.

It was discovered that by changing the length of the hoods over the A section fill channels, the time was varied for the electrolyte to enter the various cells in sufficient quantity to make the battery operative. With the hood completely extending over the A section it was found that the time for the electrolyte to enter the A section through the fill channels was excessively slow. By cutting the hoods back an appropriate distance thereby exposing several of the bottom cells of the A section to the splash distribution provided a moderately fast activation period with reliable liquid distribution after the projectile was fired.

There has been illustrated and described herein an improved energizer for reserve energizer battery for use in a spinning projectile having a new fill channel design which insures complete filling of the individual cells in each section with electrolyte and prevents a battery failure due to the incomplete filling of one portion of the battery or the flooding of another portion of the battery during operation of the projectile.

Obviously many modifications and variations of the present invention are possible in light of the foregoing teachings. It is, therefore, to be understood that within the scope of the appended claims, the invention may be practiced otherwise than as specifically described herein.

What is claimed is:

1. A split stack reserve energizer of the deferred action type for use in a spin type projectile, said energizer comprising a filament heater section of parallel connected cells located at the top of the energizer, a high voltage section of series connected cells coaxial with said parallel connected cells and located at the bottom of the energizer, a grid bias section of series connected cells abutting and coaxial with said high voltage section and said filament heater section and interposed between said parallel connected cells and said high voltage section, said sections formed by an annular stack of spaced energizer plates, an impervious insulating material encapsulating said annular stack and forming a hollow cylindrical compartment within said annular stack, said compartment having fill channel means therein wholly interrupting a wall of said compartment adjacent said annular stack, a frangible ampule fixedly mounted in said cylindrical compartment, means for breaking said ampule upon being properly accelerated, and hood means positioned within a section of said fill channel means adjacent said filament heater section of parallel connected cells for preventing electrolyte flow through said section of said fill channel to a number of cells in said parallel connection section during the splash filling of said parallel connected cells that occurs from the turbulence at the instant the electrolyte is released and forced centrifugally in the direction of said section of said fill channel.

2. A split stack reserve energizer of the deferred action type for use in a spin type projectile, said energizer comprising a filament heater section of parallel connected cells located at the top of the energizer, a high voltage section of series connected cells coaxial with said parallel connected cells and located at the bottom of the energizer, a grid bias section of series connected cells coaxial with and abutting said filament heater section and said high voltage section and interposed between said filament heater section and high voltage section, said sections being formed by an annular stack of spaced energizer plates, an impervious insulating material encapsulating said annular stack and forming a hollow cylindrical compartment of impervious insulating material within said annular stack, said compartment having fill channel means therein wholly interrupting a wall of said compartment adjacent said annular stack, paper separator means individually interposed between adjacent plates forming said series and parallel connected cells, said separator means having an opening therein for receiving electrolyte and an entry port through one wall thereof communicating with said opening, said entry port in each of said separator means aligned with and abutting said fill channel means adjacent said parallel and series connected cells, a frangible ampule fixedly mounted in said cylindrical compartment, means for breaking said ampule upon being properly accelerated, and hood means positioned within a section of said fill channel means adjacent said filament heater section of parallel connected cells for preventing electrolyte flow through said section of said fill channel to a number of entry ports within said filament heater section of parallel connected cells during splash filling of said parallel connected cells that occurs from the turbulence introduced at the instant the electrolyte is released and centrifugally forced in the direction of said entry ports and said fill channels adjacent said parallel connected cells.

3. A split stack reserve energizer for use as a power source in a spin type projectile, said energizer comprising filament heater section of parallel connected cells located at the top of the energizer, a plurality of semi-annular series connected cells forming the high voltage section of the energizer located at the bottom of the energizer and a plurality of semi-annular series connected cells forming the grid bias section of the energizer, said grid bias section being interposed between said filament heater section and said high voltage section and coaxial with said high voltage section and said filament heater section, said annular parallel connected cells and said semi-annular series connected cells being formed by an annular stack of spaced energizer plates, an impervious insulating material encapsulating said stack of energizer plates forming a hollow cylindrical compartment within the annular opening of said stack of spaced energizer plates, said compartment having a pair of fill channels therein wholly interrupting said compartment adjacent said stack of energizer plates for allowing the electrolyte to enter between said plates, said fill channels positioned, in closely adjacent relationship to each other, paper separator means individually interposed between adjacent plates forming said parallel connected cells, said separator means having a pair of openings therethrough for receiving electrolyte and a pair of entry ports through one wall thereof communicating with each of said openings respectively, said entry ports in each of said separator means aligned with and abutting a different one of said fill channels adjacent said parallel connected cells, a frangible ampule fixedly mounted in said cylindrical compartment, means for breaking said ampule upon being properly accelerated, and hood means positioned within a section of each of said fill channels adjacent said parallel connected cells for preventing electrolyte flow through a portion of said wholly interrupted section of said fill channel to a number of entry ports within said parallel connected cells during the splash filling of said parallel connected cells that occurs from the turbulence introduced at the instant the electrolyte is released and centrifugally forced in the direction of said entry ports and said fill channel adjacent said parallel connected cells.

References Cited in the file of this patent

UNITED STATES PATENTS

| 2,927,145 | Burrell | Mar. 1, 1960 |
| 2,981,778 | Freund | Apr. 25, 1961 |
| 2,981,779 | Freund | Apr. 25, 1961 |
| 2,985,702 | Darland et al. | May 23, 1961 |
| 3,067,274 | Heinsohn et al. | Dec. 4, 1962 |